US008359849B2

(12) United States Patent
Yuan

(10) Patent No.: US 8,359,849 B2
(45) Date of Patent: Jan. 29, 2013

(54) CONTROL OF A FLUID CIRCUIT USING AN ESTIMATED SENSOR VALUE

(75) Inventor: QingHui Yuan, Maple Grove, MN (US)

(73) Assignee: Eaton Corporation, Cleveland, OH (US)

( * ) Notice: Subject to any disclaimer, the term of this patent is extended or adjusted under 35 U.S.C. 154(b) by 967 days.

(21) Appl. No.: 12/419,663

(22) Filed: Apr. 7, 2009

(65) Prior Publication Data

US 2010/0251705 A1 Oct. 7, 2010

(51) Int. Cl.
*F16D 31/00* (2006.01)

(52) U.S. Cl. ........................................... 60/328; 60/403

(58) Field of Classification Search .................... 60/328, 60/403

See application file for complete search history.

(56) References Cited

U.S. PATENT DOCUMENTS 4,856,380 A * 8/1989 Murano et al. .................. 477/39
5,829,335 A 11/1998 Ewald et al.
7,073,328 B2 * 7/2006 Knoblauch ..................... 60/403

* cited by examiner

*Primary Examiner* — F. Daniel Lopez
(74) *Attorney, Agent, or Firm* — Quinn Law Group, PLLC

(57) ABSTRACT

A fluid circuit includes a tank for holding fluid, a hydraulic device having a predetermined load configuration, and a pump for delivering the fluid under pressure to the hydraulic device. Sensors measure at least one of a supply pressure, a tank pressure, and a position of a portion of the hydraulic device. A controller estimates or reconstructs an output value of any one sensor using the predetermined load configuration in the event of a predetermined failure of that sensor, ensuring continued operation of the hydraulic device. A method for estimating the output value includes sensing output values using the sensors, processing the output values using the controller to determine the presence of a failed sensor, and calculating an estimated output value of the failed sensor using the predetermined load configuration. Operation of the hydraulic device is maintained using the estimated output value until the failed sensor can be repaired.

14 Claims, 2 Drawing Sheets

CONTROL OF A FLUID CIRCUIT USING AN ESTIMATED SENSOR VALUE

TECHNICAL FIELD

The present invention relates generally to the control of an electro-hydraulic system, and in particular to an apparatus and method for maintaining control and operation of an electro-hydraulic system or fluid circuit having a failed pressure or position sensor.

BACKGROUND OF THE INVENTION

Electro-hydraulic systems or fluid circuits utilize various electrically-actuated and hydraulically-actuated devices, alone or in combination, to provide open-loop or closed loop feedback control. In a closed-loop system in particular, feedback mechanisms or sensors can be used to monitor circuit output values. Each sensor can generate a signal that is proportional to the measured output, and using a suitable control logic device or controller the output can be compared to a particular input or command signal to determine if any adjustments or control steps are required. Sensors for use in an electro-hydraulic fluid circuit ordinarily include pressure transducers, temperature sensors, position sensors, and the like.

In a conventional fluid circuit, the precise control of the operation of the fluid circuit can be maintained by continuously processing the various measured or sensed output values. Supply and tank pressures, as well as pressures operating on particular ports or chambers of a control valve, cylinder, or fluid motor used within the circuit, can be continuously fed to a control unit or controller. However, system control can be lost or severely degraded in a conventional fluid circuit if any of the required pressure or position sensors fails or ceases to function properly for whatever reason. While certain code-based methods exist for detecting out-of-range sensor operation, or for determining shorted or open circuits, such methods usually result in a temporary shutdown of the process utilizing the fluid circuit, and therefore can be less than optimal when continuous fluid circuit operation is required.

SUMMARY OF THE INVENTION

Accordingly, an electro-hydraulic system or fluid circuit includes a sump or a tank configured for holding a supply of fluid, a hydraulic device having a predetermined load configuration, and a pump for drawing fluid from the tank and delivering it under pressure to the hydraulic device. Sensors are adapted for measuring a supply pressure, a tank pressure, and a position of a moveable spool portion or other moveable portion of the hydraulic device, as well as one or more additional valves, such as a fluid conditioning valve positioned in fluid parallel with the hydraulic device. A controller has an algorithm suitable for estimating or reconstructing an output value of a failed one of any of the plurality of sensors in the fluid circuit using the predetermined load configuration, thereby ensuring the continued operation of the hydraulic device and the fluid circuit.

Using the method of the invention, which can be embodied by the computer-executable algorithm mentioned above, at least some level of control can be maintained over the fluid circuit despite the presence of the failed sensor. A quasi-steady analysis of the fluid circuit can capture the fundamentals of the fluid circuit. In a fluid circuit having a pump, a reservoir or tank, a plurality of check valves and/or fluid conditioning valves, and a cylinder, fluid motor, or other device having a first and a second work chamber or port, unknown variables $Q_a$, $Q_b$, and $Q_{fcv}$ are present, wherein $Q_a$ describes the flow into and out of a first work chamber of the cylinder, $Q_b$ is the flow into and out of a second work chamber of the cylinder, and $Q_{fcv}$ is the flow through an orifice of a fluid conditioning valve positioned or connected in fluid parallel with the cylinder and pump. In accordance with the invention, a fluid circuit configured in this manner can be modeled via a predetermined set of non-linear equations that differ depending on the failed state of the fluid circuit, i.e., a failure of a sensor occurring when the fluid circuit is active, that is, when fluid is flowing from the work chamber a to the work chamber b, or from work port b to a, as described below.

The method therefore allows for the estimating or reconstructing of an otherwise lost or unavailable sensor signal using a calibrated, known, or predetermined load configuration, e.g., in a two-port device such as a cylinder or fluid motor, the relationship between the flow rates through the respective work chambers or ports. A fluid circuit adapted for executing the method can include a controller having an algorithm suitable for processing the output values from a plurality of pressure and position sensors, calculating any required flow information using calibrated volumetric and measured pressure and/or other required data in conjunction with the pressure and position measurements, and estimating the missing sensor value using a set of non-linear equations. The controller then automatically controls the fluid circuit using the estimated value until such time as the sensor can be diagnosed, repaired, or replaced.

More particularly, the method allows for the estimation or reconstruction of an output value of any one sensor of a plurality of sensors in a fluid circuit having a controller, a pump, a tank, a hydraulic device, and a fluid conditioning valve. The conditioning valve is in fluid parallel with the hydraulic device. The method includes sensing a set of output values from the plurality of sensors, processing the output values using the controller to determine the presence of a failed sensor, and using the controller to calculate an estimated output value of the failed sensor using a predetermined load configuration of the hydraulic device. The hydraulic device can be controlled using the estimated output value until the failed sensor can be repaired or replaced, thereby ensuring continuous operation of the fluid circuit.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
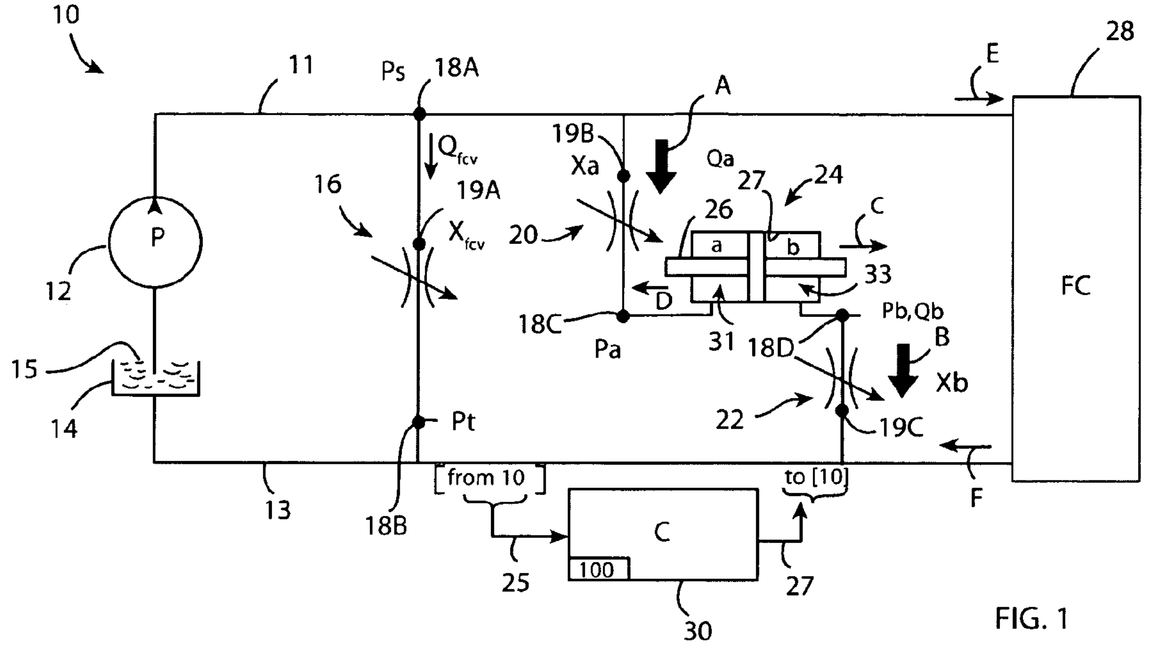
FIG. 1 is a schematic illustration of an exemplary fluid circuit in a first sensory failure state having a controller in accordance with the invention.

Referring to the drawings wherein like reference numbers correspond to like or similar components throughout the several figures, and beginning with FIG. 1, a fluid circuit 10 is shown in a first possible sensory failure state, as will be described below. The fluid circuit 10 includes a pump (P) 12 and a low-pressure reservoir, sump, or tank 14. The tank 14 holds or contains a supply of fluid 15, which is drawn by the pump 12 and delivered under pressure ($P_s$) via a supply line 11 to a hydraulic device 24. In the exemplary embodiment of FIG. 1, the hydraulic device 24 is configured as a dual-chamber cylinder 27 containing a spool or piston 26, with the cylinder 27 having a first and a second work port, 31 and 33, respectively, in communication with the work chambers a and b defined by and within the cylinder 27 and piston 26.

Control logic or an algorithm 100 for executing the method of the invention can be programmed or recorded within a controller (C) 30 and implemented to selectively control the various fluid control devices within the fluid circuit 10 as needed to power a downstream fluid circuit (FC) 28, including items such as but not limited to hydraulic machinery, valves, pistons, accumulators, etc. The FC 28 in turn is in fluid communication with the tank 14 via a return line 13.

The controller 30, which can be directly wired to or in wireless communication with the various components of the fluid circuit 10, receives a set of pressure and position input signals (arrow 25) from sensors 18A-D and 19A-C, as explained below. The fluid circuit 10 can be configured as a digital computer generally including a CPU, and sufficient memory such as read only memory (ROM), random access memory (RAM), electrically-programmable read only memory (EPROM), etc. The controller 30 can include a high speed clock, analog to digital (A/D) and digital to analog (D/A) circuitry, and input/output circuitry and devices (I/O), as well as appropriate signal conditioning and buffer circuitry. Any algorithms resident in the controller 30 or accessible thereby, including the algorithm 100 described below with reference to FIG. 3, or any other required algorithms, can be stored in ROM and automatically executed by the controller 30 to provide the required circuit control functionality.

The fluid 15 is selectively admitted into the fluid circuit 10 via the supply line 11 at the supply pressure ($P_s$). A fluid conditioning valve 16 is positioned in fluid parallel with the hydraulic device 24 between a pair of pressure sensors 18A and 18B, e.g., pressure transducers or other suitable pressure sensing devices. The sensor 18A is positioned and adapted for measuring the supply pressure ($P_s$), while the sensor 18B is positioned and adapted for measuring the return line or tank pressure ($P_t$). As needed, some or all of the fluid 15 flowing from the pump 12 can be diverted from the hydraulic device 24 through the conditioning valve 16 and back to the tank 14.

The fluid circuit 10 includes position sensors 19A, 19B, and 19C adapted for measuring the position of respective spools in the conditioning valve 16, the valve 20, and the valve 22, respectively. Additional pressure sensors 18C, 18D are positioned in fluid series with the hydraulic device 24. The sensor 18C is positioned and adapted for measuring the fluid pressure ($P_a$) operating on work chamber a or the first work port 31 of the hydraulic device 24, and is positioned downstream of a first valve 20. The first valve 20 can be configured as any suitable fluid control valve suitable for directing fluid 15 from the pump 12 in the direction of arrow C, and into the first work port 31 of the hydraulic device 24 in order to move the piston 26 in the direction of arrow C. A second valve 22 prevents a flow of fluid 15 into the work port 33. The sensor 18D is positioned and adapted for measuring the fluid pressure ($P_b$) operating on work chamber b or the second work port 33 of the hydraulic device 24.

Under normal operating conditions, the variables $P_s$, $P_t$, $P_a$, and $P_b$ are known, being sensed or measured by the respective pressure sensors 18A-18D. The position variables $x_a$, $x_b$, and $x_{fcv}$ are also known, being sensed by the position sensors 19A-C. The variables $x_a$ and $x_b$ describe the position of the piston 26 in work chambers a and b, respectively, while $x_{fcv}$ describes the position of a spool portion of the fluid conditioning valve 16. Three unknown variables include $Q_a$, $Q_b$, and $Q_{fcv}$, as noted above, i.e., the flow into the first work port 31, the second work port 33, and the conditioning valve 16, respectively. A unique solution is thus provided for these values using the following three-function equation set:

$$f1(Q_a, P_s, P_a, x_a)=0;$$

$$f2(Q_b, P_t, P_b, x_b)=0; \text{ and}$$

$$f3(Q_{fcv}, P_s, P_t, x_{fcv})=0$$

For example, $f1(Q_a, P_s, P_a, x_a)=Qa-c_dA(x_a)\mathrm{sgn}(P_s-P_a)\sqrt{2/\rho|Ps-Pa|}$, where $c_d$ is the discharge coefficient, $\rho$ is the density of the fluid, and A is the orifice area as a function of spool position.

However, in a sensory failure state in which one of the sensors 18A-D or 19A-C fails, the set of equations above cannot be uniquely solved without resorting to additional information. For example, if the pressure at work port 31 or $P_a$ is unavailable due to a failure of sensor 18C, the remaining known variables are $P_s$, $P_t$, $P_b$, $x_a$, $x_b$, and $x_{fcv}$. We now have four unknown variables, i.e., $Q_a$, $Q_b$, and $Q_{fcv}$ as before, as well as the unknown value of $P_a$.

In an observer-based model, state variables can be estimated by comparing the model outputs to actual measurements. A signal can be easily reconstructed only if the system itself is fully observable. However, observer-based models are severely challenged in the face of unknown load conditions, such as the velocity of a piston positioned within a fluid cylinder, a portion of a fluid motor, or any moveable portion of a typical two-port fluid device.

For example, a fluid circuit can be modeled via the following equation:

$$\dot{P}_a=(\beta/V)(Q_a(P_s,P_a,x_a)-A\dot{x}_{cyl})$$

wherein $\dot{P}_a$ refers to the change in fluid pressure at a first port or "work port a" of a 2-port device, $\beta$ is the bulk modulus of the fluid used in the circuit, V is the volume of the cylinder, $Q_a$ is the flow rate through work port a, $P_s$ is the supply pressure, $P_a$ is the pressure at chamber a or work port 31, and $x_a$ is the spool position of a spool or piston at chamber a or work port 31. Additionally, A is the cross-sectional area of the cylinder, and $\dot{x}_{cyl}$ is the rate of change in position of the cylinder, i.e., the velocity thereof. The value $A\dot{x}_{cyl}$ is an unknown load condition in such an exemplary cylinder.

Using the algorithm 100, the load configuration of the hydraulic device 24 can provide further constraints as determined using the unknown variables. For example, $Q_a=-Q_b$ for a cylinder/motor connection as shown in FIGS. 1 and 2, if the work chambers on either side of the cylinder 27 are equally sized, or $Q_a=-(A_a/A_b)(Q_b)$ where $A_a$ is piston area in work chamber a and $A_b$ is position area in work chamber b, if the work chambers a and b are differently sized. Therefore, the algorithm 100 can use non-linear equations to determine the unknown three variables in a first sensory failure mode. Accordingly, any one of the sensor signals $P_s$, $P_t$, $P_a$, $P_b$, $x_a$, and $x_b$ can be estimated using the above equations.

Figure 2:
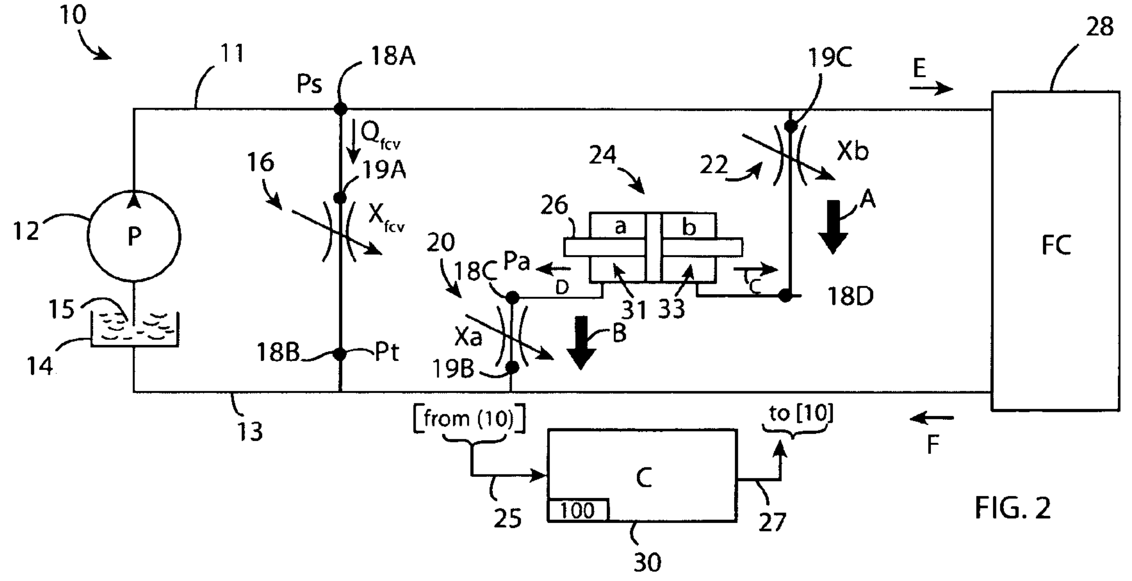
FIG. 2 is a schematic illustration of the exemplary fluid circuit of FIG. 1 in a second sensory failure state.

Referring to FIG. 2, the fluid circuit 10 of FIG. 1 is shown in a second failure sensory state, i.e., when fluid is being applied at work port 33 to move the piston 26 in the direction of arrow D. As above, any one of the missing sensor signals $P_s$, $P_t$, $P_a$, $P_b$, $x_a$, and $x_b$ can be estimated or reconstructed using the known load configuration for the hydraulic device 24.

Figure 3:
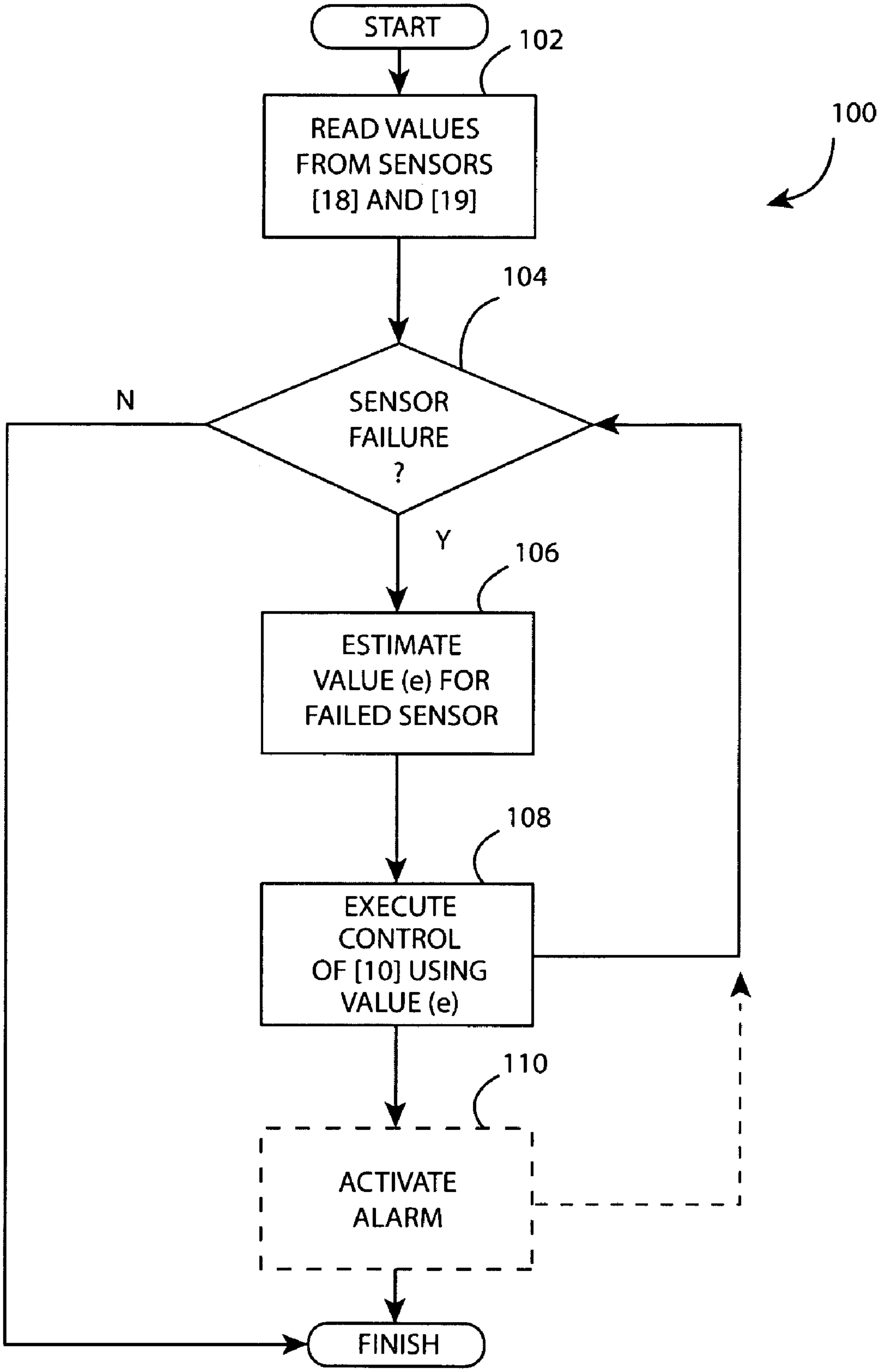
FIG. 3 is a flow chart describing a control method usable with the fluid circuit of FIGS. 1-2.

Referring to FIG. 3 in conjunction with the fluid circuit 10 of FIGS. 1 and 2, the method of the invention can be executed via the algorithm 100. Beginning at step 102, the controller 30 continuously or in accordance with a specified periodic cycle time reads the output values from each of the sensors 18A-D and 19A-C. In normal operation, the controller 30 processes these values using control logic, and selectively actuates the hydraulic device 24 and, if used, any additional downstream devices in the downstream fluid circuit 28 according to such control logic. The algorithm 100 then proceeds to step 104.

At step 104, the controller 30 determines whether any of the sensors 18A-D and 19A-C has failed. If not, the algorithm 100 is finished, effectively resuming with step 102 and repeating steps 102 and 104 until such a sensor failure is determined to be present. If a sensor has failed, the algorithm 100 proceeds to step 106.

At step 106, the algorithm 100 estimates or reconstructs the value for the failed sensor. This estimated value is represented in FIG. 3 as the value (e). For example, if the sensor 18C has failed the output value $P_a$ would be unavailable as a result. Continuing with the example of sensor 18C, the unknown variables would be $Q_a$, $Q_b$, $Q_{fcv}$, and $P_a$. However, given a known load configuration such as $Q_a=-Q_b$ for the cylinder or motor connection shown in FIGS. 2 and 3, the four unknowns reduce to three: $Q_a$ (or $Q_b$), $Q_{fcv}$, and $P_a$. The algorithm 100 then uses the non-linear equations as set forth above, i.e., $f1(Q_a, P_s, P_a, x_a)=0$; $f2(Q_b, P_t, P_b, x_b)=0$; and $f3(Q_{fcv}, P_s, P_t, x_{fcv})=0$, to estimate the value (e).

Once the estimated value (e) has been determined or calculated at step 106, the algorithm 100 proceeds to step 108, wherein the controller 30 executes control of the fluid circuit 10 of FIGS. 1 and 2 using the estimated value (e). Continued control of the fluid circuit 10 can therefore be maintained. The algorithm 100 can then be finished, or can optionally proceed to step 110.

At step 110, an alarm can be activated, or another suitable control action can be taken, to ensure that attention is drawn to the presence of the failed sensor. In this manner, the sensor failure can be properly diagnosed, repaired, or replaced as needed.

Accordingly, using the control algorithm 100 as set forth above as part of the fluid circuit 10 of FIGS. 1 and 2, single sensor fault operation of the fluid circuit 10 can be achieved. Given the load configuration, it is possible to reconstruct most of a single failed sensor signal if service is running at the time of the sensor failure. If service stops, i.e., if both work ports 31 and 33 of the hydraulic device 24 close, it can be difficult to accurately estimate the failed sensor signal.

While the best modes for carrying out the invention have been described in detail, those familiar with the art to which this invention relates will recognize various alternative designs and embodiments for practicing the invention within the scope of the appended claims. Likewise, while the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A fluid circuit comprising:
- a tank configured for holding fluid;
- a hydraulic device having a predetermined load configuration;
- a pump operable for drawing the fluid from the tank and delivering the fluid under pressure to the hydraulic device;
- a plurality of sensors each configured to measure a respective one of a supply pressure from the pump, a tank pressure at the tank, and a position of a moveable portion of the hydraulic device; and
- a controller having an algorithm, wherein the controller is configured to execute the algorithm to thereby estimate an output value of any one sensor of the plurality of sensors using the predetermined load configuration when a predetermined failure occurs in the one sensor, thereby ensuring continued operation of the hydraulic device.

2. The fluid circuit of claim 1, wherein the hydraulic device is one of a cylinder-and-piston device and a fluid motor device.

3. The fluid circuit of claim 1, further comprising a fluid conditioning valve in fluid parallel with the hydraulic device, wherein the fluid conditioning valve includes the moveable portion, and wherein the plurality of sensors includes a first position sensor configured to measure the position of the moveable portion of the fluid conditioning valve.

4. The fluid circuit of claim 1, wherein the hydraulic device has a first and a second work port, and wherein the predetermined failure is a failure occurring when the fluid is being delivered from the pump to one of the first work port and the second work port.

5. The fluid circuit of claim 1, wherein the controller is configured to estimate the output value using a predetermined set of non-linear equations.

6. A fluid control system adapted for use with a fluid circuit having a tank configured for holding fluid, a hydraulic device having a piston disposed in a cylinder to define a first and a second work port in conjunction therewith, a fluid conditioning valve having a spool portion, and a pump operable for drawing the fluid from the tank and delivering the fluid under pressure to one of the first and the second work ports, the fluid control system comprising:
- a set of pressure sensors each adapted for measuring one of a supply pressure from the pump, a tank pressure at the tank, a first pressure at the first work port, and a second pressure at the second work port;
- a set of position sensors adapted for measuring a respective position of the spool portion of the conditioning valve and a position of the piston; and
- a controller having an algorithm, wherein the controller is adapted for executing the algorithm to thereby estimate an output value of any one sensor of the pressure and position sensors using a predetermined load configuration of the hydraulic device in the event of a predetermined failure of the one sensor, thereby ensuring continued operation of the hydraulic device.

7. The fluid control system of claim 6, wherein the predetermined load configuration is modeled within the controller as a calibrated equation describing a ratio of the flow rates through the first and the second work ports.

8. The fluid control system of claim 6, wherein execution of the algorithm causes the controller to estimate the output value by calculating solutions to a set of three different non-linear equations.

9. The fluid control system of claim 8, wherein each of the non-linear equations is a function of a flow rate through one of the hydraulic device and the fluid conditioning valve.

10. The fluid control system of claim 9, wherein each of the non-linear equations is a function of the tank pressure, the supply pressure, a position of the piston, and a position of the spool portion of the conditioning valve.

11. A method for estimating or reconstructing an output value of any one sensor of a plurality of sensors in a fluid circuit having a controller, a pump, a tank, a hydraulic device, and a fluid conditioning valve in fluid parallel with the hydraulic device, the method comprising:

sensing a set of output values from the plurality of sensors;

processing the set of output values using the controller to thereby determine the presence of a failed sensor among the plurality of sensors;

using the controller to calculate an estimated output value of the failed sensor in response to the determination of the failed sensor, wherein calculation of the estimated value includes using a predetermined load configuration of the hydraulic device to derive a set of non-linear equations having just three unknown variables; and automatically controlling an operation of the hydraulic device using the estimated output value until the failed sensor is repaired or replaced, thereby ensuring continuous operation of the fluid circuit.

12. The method of claim 11, wherein processing the set of output values includes comparing each output value in the set of output values to a calibrated threshold to determine the presence of the failed sensor.

13. The method of claim 11, wherein using the controller to calculate an estimated output value includes solving for one of the three unknown variables to thereby determine the estimated output value.

14. The method of claim 11, wherein the hydraulic device has a pair of work ports, and wherein the predetermined load configuration is a calibrated flow ratio of the pair of work ports.

* * * * *